Dec. 18, 1951   L. B. SAMPSON   2,579,013
APPARATUS FOR HARVESTING ONIONS
Filed May 4, 1946   2 SHEETS—SHEET 1
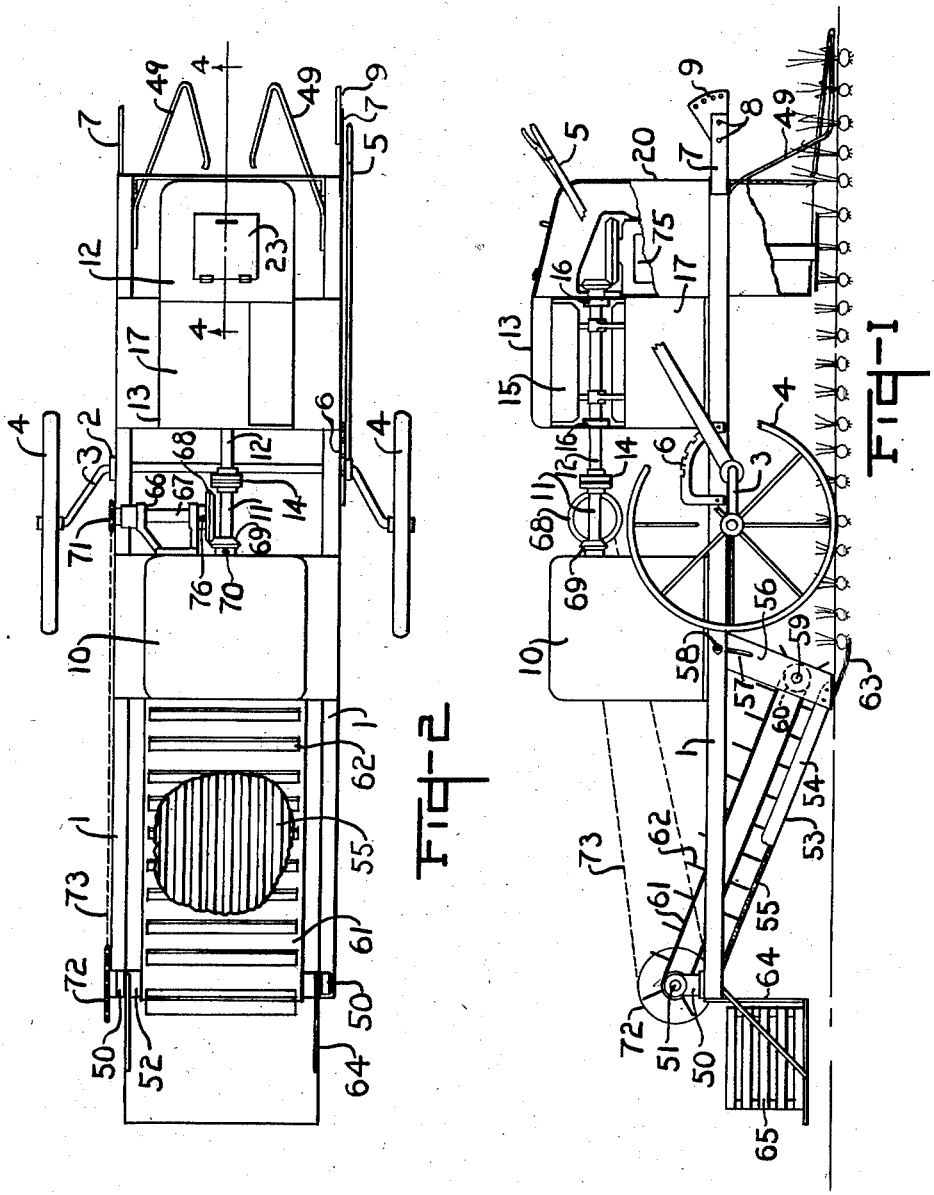
INVENTOR
L.B. Sampson
BY Roy A. Plant
ATTORNEY Dec. 18, 1951     L. B. SAMPSON     2,579,013
APPARATUS FOR HARVESTING ONIONS
Filed May 4, 1946     2 SHEETS—SHEET 2
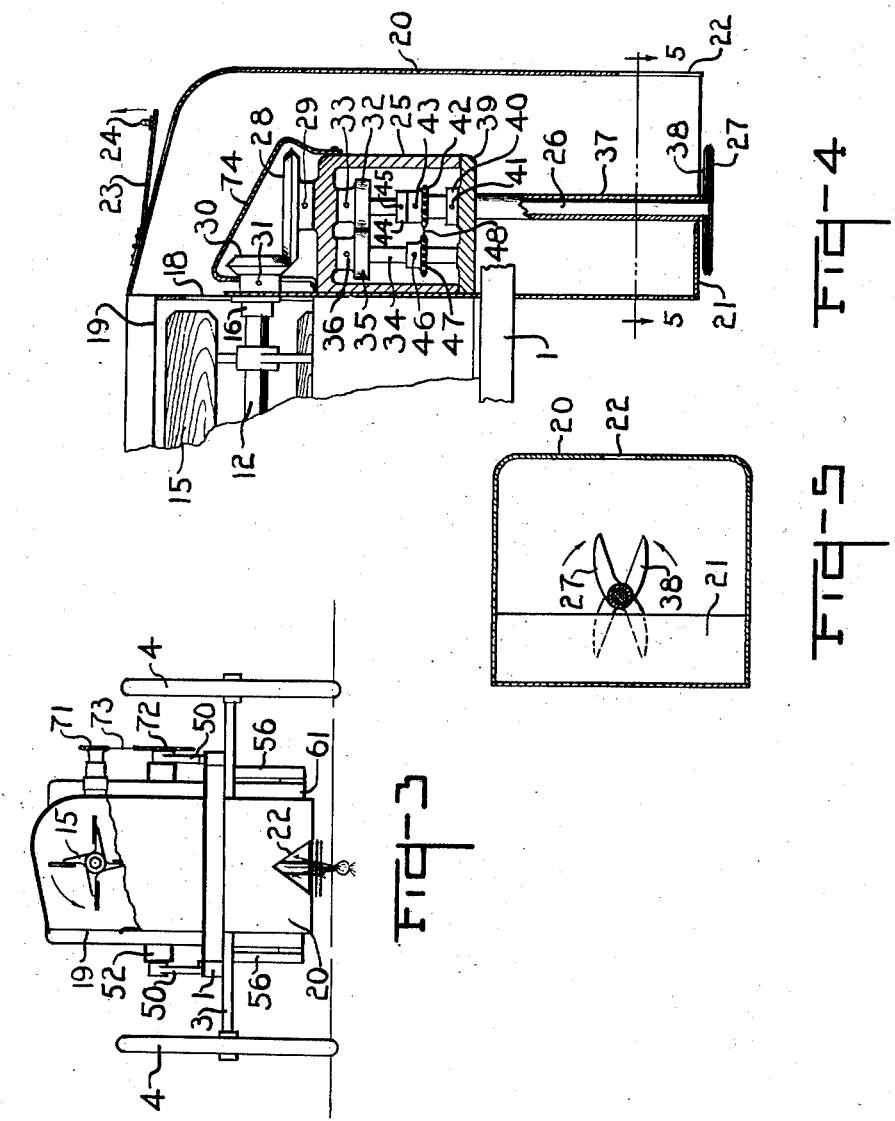
INVENTOR
L.B. Sampson
BY Roy A. Plant
ATTORNEY Patented Dec. 18, 1951

2,579,013

UNITED STATES PATENT OFFICE 2,579,013

APPARATUS FOR HARVESTING ONIONS

Lyle B. Sampson, East Leroy, Mich.

Application May 4, 1946, Serial No. 667,457

13 Claims. (Cl. 55—9)

The present invention relates broadly to harvesting machinery and harvesting methods, and in its specific phases to an onion harvester and a method of harvesting onions.

Onion harvesting presents many difficult problems, some of which are peculiar to this product. For instance, when the onions reach maturity, and are ready for harvesting, it is common for them to set on top of the ground and be held in place only by their roots. At the same time the tops will be largely broken over in various directions so as to present a generally matted appearance. It has been proposed in connection with the harvesting of onions to run upright rotary disc knives along opposite sides of each onion row to sever the matted tops by pressing them against the ground. This overlooks the fact that even if the severing is successful the tops are still matted lengthwise of the row between the cutting discs. There are also numerous stiff upright onion top spikes in a field of onions at harvest time. These present a different harvesting problem since the onion, in many cases, will tip over with a sidewise push on the stiff spike and thus vary the topping conditions.

The difficulties noted have led to the universal plan of hand pulling and topping onions. However, the onion crop becomes ripe and ready for harvesting all about the same time for a given territory with the result that there is not enough skilled help available to handle the pulling and topping work when the onions are in prime condition. It was with a view to meeting these difficulties and special problems of the onion harvesting industry, and to overcoming the shortcomings of the prior art, that the present invention was made.

Accordingly among the objects of the present invention is the provision of a method and apparatus for removing tops from onions while the latter remain rooted to the ground.

Another object is to provide a method and apparatus for severing tops from standing agricultural products, and moving same in an air current to a point of discharge.

Another object is to mechanically raise the flattened onion tops before severing same.

Another object is to pneumatically hold the onion tops in elevated position while same are being severed from the onion bulb.

Another object is to provide means for shearing the pneumatically lifted tops from the onion bulbs.

Another object is to provide means for pneumatically separating the severed onion tops from the onion bulbs and delivering the former to a point of disposal.

A further object is to provide means for digging the onions, after their tops have been removed, and means to elevate and deliver them to a suitable receiving point.

A further object is to provide a machine which is so organized that it not only tops onions but disposes of the tops, digs the onions, and forwards them to a suitable point of delivery.

A further object is to provide an onion harvesting machine, the operating portions of which are adjustable to and from the ground so as to meet varying harvesting conditions.

A further object is to provide an onion digger and elevator which not only separates the onions from loose dirt, but which is also independently adjustable so that the digging end of same may be suitably raised or lowered to accomplish the digging without interfering with the operation of the other portions of the harvesting assembly.

A further object is to provide a harvester of the character described which is adapted to be towed by a tractor, and which has means for adjusting the two relative to each other.

A further object is to provide an onion harvesting machine wherein the topping knives, pneumatic top remover, and elevator are all driven from a single source of power.

A still further object is to provide an onion harvesting machine, the principles of operation of which are fundamentally sound, and the apparatus strong, durable, highly efficient, and reliable in operation.

Still further objects and advantages of the present invention will appear as the description proceeds.

To the accomplishment of the foregoing and related ends, the invention, then consists of the steps and means hereinafter fully described and particularly pointed out in the claims, the annexed drawings and the following description setting forth in detail certain means and one mode of carrying out the invention, such disclosed means and mode illustrating, however, but one of the various ways in which the principle of the invention may be used.

In said annexed drawings—

Figure 1 shows a side elevation, partially in section, of a preferred form of the present invention.

Figure 2 shows a top view of the assembly illustrated in Figure 1 with part of the conveyor broken away to show under parts.

Figure 3 shows a front view of the assembly illustrated in Figures 1 and 2, with certain of the parts omitted and others shown in section for ease of understanding the construction of the apparatus.

Figure 4 shows an enlarged and partially sectioned substantially center longitudinal view through the cutting and suction portion of the assembly as viewed along line 4—4 of Figure 2 looking in the direction of the arrows.

Figure 5 shows a section view of the cutting and suction portion of the apparatus as taken along line 5—5 of Figure 4 looking in the direction of the arrows.

Referring more particularly to the drawings it will be noted that the assembly has a frame 1 with bearings 2 for an offset axle 3 on which are conventionally mounted a pair of wheels 4 for carrying the apparatus. Fastened to axle 3 is a latch carrying type operating handle 5 adapted to engage notched quadrant 6 in conventional manner for raising or lowering the frame carried portion of the assembly as required. This lever and quadrant may be mounted on either side of the assembly, but for convenience of operation it is preferably placed on the side of the assembly which has the towing connection. The forward end of the frame has, on each side, an extending member 7 on which is removably mounted, by means of bolts 8, an adjustable connection towing member 9 which permits the assembly to be connected to a tractor or the like for towing in the usual manner.

The assembly is provided with an engine 10 of suitable size for operating the driven portions of the apparatus, and such engine is preferably of the motor fuel actuated type. Shaft 11, which extends from the engine, is conventionally joined to shaft 12 of blower fan assembly 13 by means of coupling 14. Fan shaft 12, which carries an impeller 15, is mounted in conventional manner on bearings 16 (Figure 1) in fan housing 17 which has an inlet 18 (Figure 4) and an outlet 19 (Figure 3) for air borne onion tops severed from standing onions as will be hereinafter described.

Mounted on the front of the assembly is a suction box 20, the upper end of which opens into fan inlet 18. The lower end of the suction box is preferably open with the exception of a back bottom partition 21 (Figures 4 and 5) which acts to increase the air inflow velocity in the front or onion top cutting area. At the lower front edge of the suction box is a vertical notch 22 which is preferably of inverted V shape. This notch facilitates the entry of the stiff spiked onions under the front edge of the suction box for cutting as will be hereinafter described. At the top of suction box 20 is a hinged door 23 with latching handle 24. This door facilitates inspection, cleaning, and oiling of the fan and knife operating mechanism whenever required.

A small gear case 25, which for clarity and ease of illustration is shown in enlarged size in Figure 4, is rigidly mounted in conventional manner within suction box 20 at the forward end of the blower fan assembly 13. A vertical shaft 26, having a cutting blade 27 on its lower end, passes vertically through gear case 25 and has a bevel gear 28 fastened on its upper end by means of a pin 29, or the like. Gear 28 in turn meshes with a bevel pinion gear 30 which is fastened by means of a pin 31 to fan shaft 12. Rotation of fan shaft 12 in a counterclockwise direction, as viewed from the front, thus drives cutting blade 27 in a clockwise direction as shown in Figure 5.

Mounted on shaft 26 within gear case 25 is a spur gear 32 which is anchored to shaft 26 by means of a pin 33. A jack shaft 34 is mounted in gear case 25 parallel to shaft 26, and carries a spur gear 35 the same size as spur gear 32. Spur gear 35 is anchored to shaft 34 by means of pin 36, or the like. With these two spur gears in mesh, any rotation of shaft 26 will cause jack shaft 34 to rotate at the same angular rate in the opposite direction.

Mounted on shaft 26 and concentric therewith for rotation thereon is a close fitting but freely rotatable tubular shaft 37 which carries cutting blade 38 on its lower end. Shaft 37 passes through bottom plate 39 of gear case 25, and the opening therethrough may be bushed or otherwise prepared to act as a suitable bearing for shaft 37. A collar 40, fastened to shaft 37 by means of set screw 41, bears on the upper face of bottom plate 39 and holds shaft 37 against downward movement while permitting adjustment of cutting blade 38 relative to cutting blade 27 so as to facilitate shearing action upon rotation of the blades relative to each other. Access for inspection and adjustment of the parts in gear case 25 is obtained in conventional manner by means of a side plate 75 (Figure 1).

Sprocket 42 is anchored to the upper end of shaft 37 by means of a set screw 43, or the like. Bearing against the top face of the sprocket is a collar 44 which is adjustably fastened to shaft 26 by means of a set screw 45 which permits adjustment to hold blades 27 and 38 from separating under shearing operation. Fastened on jack shaft 34 by means of pin 46 is a second sprocket 47 which is of the same size as sprocket 42. Chain 48 joins sprockets 42 and 47 so that both will rotate in the same direction. It will thus be seen that with this combination of gearing and chain drive, cutting blades 27 and 38 will rotate at the same angular rate in opposite directions and by adjusting the angular position of the blades relative to each other they can be made to clip in forward position as shown in Figure 5. By having multiple blades multiple clipping can take place per revolution of the shafts. For example, the double blades shown will cause two front cuts per revolution of the shafts.

In order to loosen the onion tops before applying lifting suction to them, a pair of mechanical lifting arms 49 (Figures 1 and 2) are fastened to frame 1 and extend in front of suction box 20. The forward end of each of these arms passes under the onion tops and lifts them upward as the apparatus moves forward along the onion row. When the tops leave the free end of the arms they are at the front edge of the suction box 20 where the flow of air into the box can lift them upward for clipping by rotary knives 27 and 38. This mechanical loosening of the onion tops is particularly valuable where the ends of some of the tops have been stuck to the ground due to heavy rains or other conditions producing a similar effect.

Mounted on the rear end of frame 1 are a pair of pillow block bearings 50 carrying a cross shaft 51 on which is conventionally fastened a belt roller 52. Pivoted about shaft 51 is trough assembly 53 which has side boards 54 and close spaced longitudinal bottom slats 55 to permit loose dirt to pass through between them. The lower end of trough assembly 53 is rigidly joined at each side to end members 56. The upper end of each of these end members is provided with an arcuate slot 57, or the equivalent, adapted to engage a suitable anchoring means 58 so that the forward end of the trough assembly may be adjusted to desired height and locked in place. Mounted on the end members 56 at approximately the same height above slats 55 as shaft 51 is a second shaft 59 carrying a suitable roller 60. Passing around rollers 52 and 60 is an endless belt 61 on which are conventionally mounted a series of cross flights 62. These cross flights, which are preferably made of heavy canvas belting or other semi-flexible material, extend out from endless belt 61 a sufficient distance to bring them substantially into contact with slats 55 so that as they move up those slats the onions will be carried upward by them. At the lower front end of trough assembly 53 is a forward projecting, substantially V shaped, and rounded nose, sharpened edge digger 63 for lifting the topped onions so that flights 62 can slide them up slats 55 to the delivery end of trough assembly 53.

On the rear end of frame 1 is preferably mounted a platform 64 which is braced in conventional manner and adapted to carry a crate or crates 65 in position to receive the topped and dug onions delivered from the upper end of trough assembly 53. The showing of this construction is to be considered as diagrammatic of the various ways in which this end can be accomplished.

The apparatus for driving endless belt 61 preferably includes a bearing bracket 66 (Figure 2) mounted on the forward end of engine 10. This bracket carries shaft 67 with bevel gear 68 mounted on the inner end of same by means of pin 76. Gear 68 in turn meshes with bevel gear 69 fastened to shaft 11 in conventional manner, such as with a pin 70. On the outer end of shaft 67 is fastened a chain sprocket 71 which is connected to sprocket 72 on shaft 51 by means of chain 73. With the apparatus thus assembled the running of engine 10 to rotate the fan as shown in Figure 3, will cause endless belt 61 to move in clockwise direction as viewed in Figure 1. By varying the size of the gears and sprockets different speed ratios can be obtained, and in preferred construction the speed of endless belt 61 under normal operating conditions is slightly faster than the ground speed of the onion harvester, although the invention is not limited to that speed.

To operate the assembly it is connected to a suitable source of towing power, such as a tractor (not shown), and the whole apparatus adjusted so as to be at the right height above the ground to both top and dig the onions. Engine 10 is then started and the apparatus is ready to be pulled down a row of onions. It should be noted at this point that the wheels are spaced so as to come between rows, and the outlet from the fan is set to blow the severed tops out onto the harvested portion of the field. If the onion tops are dusty the fan outlet can be directed in a downward direction and thus reduce the amount of floating dust. With the apparatus thus in operation it is towed down a row of onions with the mechanical lifting arms 49 lifting the onion tops and releasing them at the inlet to suction box 20 where the suction caused by fan 13 lifts them upward while blades 27 and 38 shear them. The flowing air then takes the severed tops and carries them through suction box 20 past gear case 25 and gear guard 74, through blower fan assembly 13 and out of its outlet for deposit on the harvested side of the apparatus. As the assembly moves forward the topped onions reach digger 63 which loosens and raises them so that the cross flights 62 on endless belt 61 contact and push them up the bottom slats 55 of the conveyer where the loose dirt separates from the onions which are discharged from the upper end of slats 55 into crate 65 ready for transportation to a point of sorting and storage.

Other modes of applying the principle of my invention may be employed instead of the one explained, change being made as regards the means and steps herein disclosed, provided those stated by any of the following claims or their equivalent be employed.

I therefore particularly point out and distinctly claim as my invention:

1. In an apparatus of the character described, the combination which comprises a suction fan, a suction box connected to the inlet of the fan, the inlet end of said suction box being open, a cutting means at the inlet to said suction box, a digging means, a conveyer, means for supplying operating power to said fan, and means for supporting said apparatus and facilitating movement thereof, said cutting means at the inlet to said suction box being at the forward end of said apparatus, and followed in order by said digging means and conveyer.

2. An onion harvesting apparatus, which comprises a suction fan, a suction box connected to the inlet of said fan at the forward end of the assembly, the inlet of said suction box being open and spaced a short distance above ground under conditions of use, means for increasing the velocity of the air flowing through the inlet into said suction box, an onion top cutting means at the inlet to said suction box, an onion digging means behind said top cutting means, a conveyer for receiving and elevating the onions as dug, means for supplying power to operate said fan, and means for supporting said apparatus and facilitating movement of same for harvesting onions.

3. An onion harvesting apparatus, which comprises a frame, wheeled supporting means for said frame, a suction box at the forward end of the assembly, a suction fan connected to the outlet from said suction box, the inlet of said suction box being open and spaced a short distance above ground under conditions of use, means for increasing the velocity of the air flowing through the inlet into said suction box, an onion top cutting means of rotary type at the inlet to said suction box, an onion digging means behind said top cutting means, a conveyer for receiving and elevating the onions as dug, and means mounted on said frame for supplying power to operate said fan.

4. A composite harvesting apparatus for topping, digging, and elevating onions, which comprises a frame, wheeled supporting means for said frame, a suction box at the forward end of the assembly, a suction fan connected to the outlet from said suction box, the bottom of said suction box being open and spaced a short distance above ground under conditions of use, an onion top cutting means carried by said frame at the inlet to said suction box, an onion digging means mounted on said frame behind said top cutting means, a conveyer carried by said frame for receiving and elevating the onions as dug, means mounted on said frame for supplying power to operate said fan, and means for adjusting said wheeled supporting means to vary the elevation of the said frame above ground.

5. A composite harvesting apparatus for topping, digging, and elevating onions, which comprises a frame, wheeled supporting means for said frame, a suction box at the forward end of the assembly, a suction fan connected to the outlet from said suction box, the bottom of said suction box being open and spaced a short distance above ground under conditions of use, an onion top cutting means carried by said frame at the inlet to said suction box, an onion digging means mounted on said frame behind said top cutting means, a conveyer carried by said frame for receiving and elevating the onions as dug, means mounted on said frame for supplying power to operate said fan, means for adjusting said wheeled supporting means to vary the elevation of said frame above ground, and mechanical lifting arms extending forward adjacent the ground in front of the suction box.

6. A composite harvesting apparatus for topping, digging, and elevating onions, which comprises a frame, wheeled supporting means for said frame, a suction box at the forward end of the assembly, a suction fan connected to the outlet from said suction box, the bottom of said suction box being open and spaced a short distance above ground under conditions of use, rotary shears carried by said frame at the inlet end of said suction box for severing the onion tops from the onions, an onion digging means mounted on said frame behind said top cutting means, a conveyer carried by said frame for receiving and elevating the onions as dug, and means mounted on said frame for supplying power to operate said fan and rotary shears.

7. A composite harvesting apparatus for topping, digging, and elevating onions, which comprises a frame, wheeled supporting means for said frame, a suction box at the forward end of the assembly, a suction fan connected to the outlet from said suction box, the bottom of said suction box being open and spaced a short distance above ground under conditions of use, rotary shears carried by said frame at the inlet end of said suction box for severing the onion tops from the onions, an onion digging means mounted on said frame behind said top cutting means, a conveyer carried by said frame for receiving and elevating the onions as dug, means mounted on said frame for supplying power to operate said fan and rotary shears, and means for adjusting said wheeled supporting means to vary the elevation of said frame above ground.

8. A composite harvesting apparatus for topping, digging, and elevating onions, which comprises a frame, wheeled supporting means for said frame, a suction box at the forward end of the assembly, a suction fan connected to the outlet from said suction box, the bottom of said suction box being open and spaced a short distance above ground under conditions of use, rotary shears carried by said frame at the inlet end of said suction box for severing the onion tops from the onions, an onion digging means mounted on said frame behind said top cutting means, a conveyer carried by said frame for receiving and elevating the onions as dug, means mounted on said frame for supplying power to operate said fan and rotary shears, means for adjusting said wheeled supporting means to vary the elevation of said frame above ground, and mechanical lifting arms extending forward adjacent the ground in front of the suction box.

9. In an onion harvesting machine having topping, digging, and onion conveying members, wherein the topping portion of the assembly has a suction box having an open inlet at its bottom, a suction fan, means for connecting the inlet of said fan to the outlet from said suction box, rotary shears at the inlet end of said suction box, said rotary shears including concentric shafts, a blade on the lower end of each of the shafts, said blades moving in shearing relation to each other, a gear case, means in said gear case for holding said blades in proper relation to each other and causing them to rotate in opposite directions with timing so as to clip at the forward edge of the suction box inlet, a source of power, and means for operably connecting said source of power to said fan, rotary shears, and conveyer.

10. In an onion harvesting machine which has a frame, an offset axle pivotally mounted on said frame, ground contacting wheels on said axle, means for pivotally moving and holding said axle to vary the height of said frame above ground, and onion topping, digging, and conveying members mounted on said frame, the combination wherein said topping portion of the assembly has a suction fan, a suction box in front of said fan with the inlet of the fan connected to the outlet from the suction box, the inlet of said suction box being open and spaced a short distance above ground under conditions of use, means for increasing the velocity of the air flowing through the inlet into said suction box, rotary shears at the inlet end of the suction box arranged and timed to clip substantially parallel to the ground and adjacent the forward edge of the suction box, said rotary shears including concentric shafts, a blade on the lower end of each of the shafts, said blades moving in shearing relation to each other, a gear case, means in said gear case for holding said blades in proper relation to each other and causing them to rotate in opposite directions, an engine, means for connecting said engine to drive the moving parts of said assembly including said fan, and rotary shears, and mechanical lifting arms for onion tops, said arms extending forward adjacent the ground in front of the suction box.

11. In an onion harvesting machine, wherein the onion topping portion of the machine has a suction box having an open inlet at its bottom and an inverted upwardly extending substantially V-shaped notch in its forward edge, a suction fan, means for connecting the inlet of said fan to the outlet from said suction box, rotary shears substantially behind said notch and at the inlet end of said suction box for cutting onion tops extending through said inlet into said suction box, a source of power, and means for operably connecting said source of power to said fan and said rotary shears.

12. In an onion harvesting machine, wherein the onion topping portion of the machine has a suction box having an open inlet at its bottom and an inverted upwardly extending substantially V-shaped notch in its forward edge, a suction fan, means for connecting the inlet of said fan to the outlet from said suction box, rotary shears substantially behind said notch and at the inlet end of said suction box for cutting onion tops extending through said inlet into said suction box, said rotary shears including concentric shafts, a blade on the lower end of each of the shafts, said blades moving in shearing relation to each other, and means for connecting said blades so that they rotate in opposite directions and clip at the inlet in the forward edge of the suction box, a source of power, and means for operably connecting said source of power to said fan and rotary shears.

13. In an onion harvesting machine wherein the onion topping portion of the machine has a suction box having an open inlet at its bottom and an inverted upwardly extending substantially V-shaped notch in its forward edge, a suction fan, means for connecting the inlet of said fan to the outlet from said suction box, means for increasing the velocity of the air flowing through the inlet into said suction box, rotary shears outside but substantially behind said notch and at the inlet end of said suction box for cutting onion tops extending through said inlet into said suction box, said rotary shears including concentric shafts, a blade on the lower end of each of the shafts, said blades moving in shearing relation to each other, a gear case, means in said gear case for holding said blades in proper relation to each other and causing them to rotate in opposite directions with timing so as to clip at the inlet in the forward edge of the suction box, a source of power, and means for operably connecting said source of power to said fan and rotary shears.

LYLE B. SAMPSON.

REFERENCES CITED

The following references are of record in the file of this patent:

UNITED STATES PATENTS

| Number | Name | Date |
|---|---|---|
| 811,524 | Stewart | Jan. 30, 1906 |
| 832,817 | Sherman | Oct. 9, 1906 |
| 894,675 | Lundy | July 28, 1908 |
| 1,074,827 | Winchester | Oct. 7, 1913 |
| 1,347,733 | Davis | July 27, 1920 |
| 1,371,360 | Frankman | Mar. 15, 1921 |
| 1,978,505 | Powers | Oct. 30, 1934 |
| 2,154,564 | Eisenlohr | Apr. 18, 1939 |
| 2,171,750 | Hooe | Sept. 5, 1939 |
| 2,227,818 | Bayouth | Jan. 7, 1941 |
| 2,256,219 | Ronning | Sept. 16, 1941 |